Figure 1:
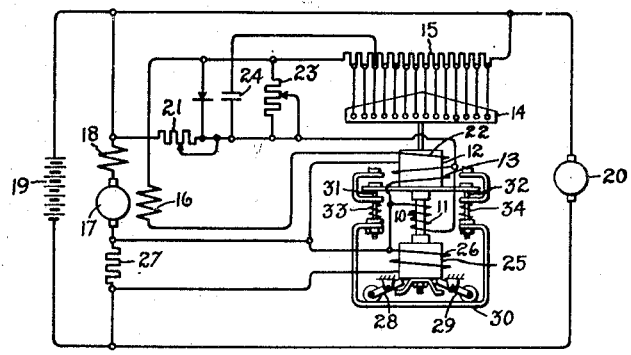

Sept. 13, 1949.　　　G. I. DUTTON ET AL　　　2,481,986
STABILIZING CIRCUIT
Filed Oct. 22, 1948

Inventors:
George I. Dutton,
Roy E. Fountain,
by Harell J. Mack
Their Attorney.

Patented Sept. 13, 1949

2,481,986

UNITED STATES PATENT OFFICE 2,481,986

STABILIZING CIRCUIT

George I. Dutton, North East, and Roy E. Fountain, Erie, Pa., assignors to General Electric Company, a corporation of New York Application October 22, 1948, Serial No. 55,902

8 Claims. (Cl. 322—24)

Our invention relates to electrical regulating systems and apparatus and has particular significance in connection with variable resistance type regulators of the dynamic multi-contact type having a fixed coil and floating coil such as that illustrated and described in Pat. 2,064,621 issued December 15, 1936, to Jacob W. McNairy and assigned to the assignee of the present invention. More particularly the present invention relates to means for stabilizing the operation of a regulating system incorporating such a relay.

Such a dynamic relay may have a fixed coil and a floating coil connected in parallel, the two being arranged in series with a control resistance and one application is to use the relay to regulate voltage. As the voltage changes, the floating coil is actuated against calibrating springs to operate a contact bar and set of contact fingers so as to, for example, insert resistance in the field circuit of a generator to regulate its output voltage at some predetermined value.

In order, however, to prevent over-shooting or hunting in the operation of such an electrical relay, some means must be employed to oppose excessive movement of the floating element. To this end it has been known to apply, to one or more windings arranged to act upon the floating element, a stabilizing current which is a transient sufficiently delayed in time phase so as not to oppose normal movement of the regulator. Such a delayed transient current may be applied either to a separate stabilizing winding or to a primary actuating winding of the regulator. Such transient current must be of sufficient intensity to adequately carry out its stabilizing function. However, as the impedance of the stabilizing circuit is reduced to allow a stabilizing current of sufficient intensity, the steady state power loss through this circuit becomes appreciable. Furthermore, this steady state current will vary over a wide range (with variation in operation of the machine being regulated) and thereby limit the speed or field current range over which constant voltage can be readily maintained.

It is an object of the present invention to provide means for overcoming the above-mentioned difficulties.

It is a further object of the present invention to provide a stable, reliable, sensitive, rugged, simple and substantially stepless voltage regulator together with means for quickly damping and preventing over-shooting in the operation thereof.

It is a further object of our invention to provide in a dynamic regulating system a stabilizing circuit having relatively low impedance to transient and stabilizing currents and relatively high impedance to steady state currents.

Broadly the means employed in the embodiment herein illustrated and described comprises a relay of the dynamic multi-contact type adapted to control a variable resistor connected in series circuit relationship with the shunt field of a dynamo-electric machine, the regulator being controlled by an actuating winding energized in response to the machine voltage. A capacitor and rectifier is added to the circuit to separate stabilizing and compounding functions, allowing more leeway in compounding as well as providing more satisfactory stabilizing means.

Figure 2:
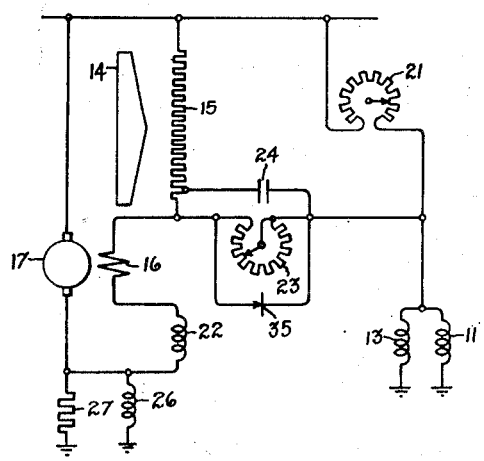

Other objects and advantages will become apparent and our invention will be better understood by reference to the following description taken in connection with the accompanying drawing in which Fig. 1 is a simplified diagram of circuit connections of an embodiment of our improved regulating system and Fig. 2 is an elementary schematic diagram of a portion of the circuit of Fig. 1.

In Fig. 1 we have illustrated schematically a regulator which is structurally similar to that shown in Figs. 6 and 7 of McNairy Pat. 2,064,621. The structural details of such a relay are adequately described in the patent. Briefly, however, the regulator comprises a magnet type field structure 10 arranged to be magnetized by a stationary main field exciting winding 11. As described in the patent, the field structure defines two air gaps within each of which is suspended a cup-shaped floating element and through each of which a substantially constant magnetic field passes in a radial direction. The upper cup-shaped floating element 12 is a voltage element. The substantially constant magnetic field across the upper air gap is in a radial direction with respect to the cup-like moving element 12 which is provided with a winding 13 (sometimes herein referred to as the floating shunt coil). The moving element 12 is mechanically connected directly to a contact bar 14 which, when moved in a downward direction, gradually inserts the sections of a tapped resistor 15 in series with a shunt field winding 16 of a D. C. generator having an armature 17. In the embodiment of the invention illustrated in Fig. 1, generator 17 is provided with a commutating field winding 18 and is connected to charge a battery 19 and to supply electric current to an external load such as a motor 20. Since battery, generator armature, and load connections are conventional, the usual line contactors and reverse current relay have been omitted from the drawing.

In order that the floating shunt coil 13 will be energized in accordance with a manually predetermined portion of the terminal voltage of the generator, it is connected across the terminals of the generator in series with a variable resistor or control rheostat 21. In the arrangement shown, the regulator field exciting winding 11 (i. e., the fixed operating coil) is shown connected in parallel circuit relationship with the floating shunt coil 13 and establishes in the field structure 10 a magnetic field of substantially constant strength. The moving cup-shaped element 12 is provided with a second moving coil 22 (sometimes herein referred to as the floating series coil) through which the shunt field current itself passes in such a direction as to set up a flux opposing the flux established by floating shunt coil 13. The coil 22 serves as a proportional re-set element to compensate for the drooping characteristics of moving coil 13 and also to compensate for any variation in contact pressure. Thus with the windings 13 and 22 in opposition, any increase in field current decreases the effect of winding 13 and any decrease in field current increases the effect of winding 13.

The circuit may be more clearly understood from reference to Fig. 2 which is an elementary schematic diagram of a portion of the circuit of Fig. 1. Identical parts have been like numbered in the two figures. As shown in Figs. 1 and 2 the floating shunt coil 13 is also connected substantially across the shunt field winding 16 and the floating series regulator winding 22 through a stabilizing rheostat 23 and a capacitor 24 connected substantially in parallel circuit relation. The stabilizing rheostat 23 allows a predetermined measure of feed-back from the generator field circuit into the voltage portion (i. e. that acting upon the upper cup 12) of the regulator control circuit. The capacitor 24 allows using a high value of stabilizing resistance in order to reduce the steady state power loss without such a large resistance value preventing or unduly hampering the transient stabilizing effect of transient surges. Furthermore, with a multi-contact type of regulator relay such as that herein described the capacitor 24 may be tapped, as shown, onto a predetermined selected portion of the field regulating resistance 15 to secure a change in the time constant of the stabilizing connection and thereby provide selective capacitor stabilization.

The above analysis relates particularly to the voltage portion of the regulator control circuit. However, as explained in the above McNairy Patent 2,064,621, in addition to the upper or voltage cup-like moving element 12, a lower moving cup-shaped floating element 25 carries a current responsive actuating coil 26 sometimes herein referred to as the series current limit coil. This coil 26 is energized from a current limit shunt 27 in the generator armature circuit. This connection is arranged to limit the current in the generator shunt field winding to a predetermined maximum value. As described in connection with Figs. 6 and 7 of the above McNairy patent, the moving cap 25 is positioned in the air gap at the lower part of the magnetic field structure and is loosely connected to the upper moving element 12, and the contact bar 14, by a one way linkage so that current limit element 25 may exert a downward but not an upward force upon the moving element 12 and contact bar 14. Ordinarily, the current limit element 25 is spring biased downwardly against a fixed stop where it is out of engagement with the one way connecting linkage. Upon the passage of a predetermined maximum value of current through the generator armature 17, the current limit movable element 25 of Fig. 1 will move upwardly to engage a pair of levers 28, 29 which are centrally pivoted at fixed points and have rolling contact at one end with a U-shaped yoke 30. The upper end of yoke 30 is connected by bolts 31 and 32 to the voltage responsive floating element 12 and to the lower end of a pair of tension springs 33 and 34. The upper ends of the springs are connected to the regulator frame thereby to bias the floating voltage responsive element 12 and the U-shaped yoke 28 upwardly.

The embodiment illustrated in Figs. 1 and 2 of the present application differs from those shown and described in the McNairy patent in the provision of what may be referred to as the selective capacitor stabilization feature heretofore described. It should be noted that such a feature could be provided only on a dynamic or multi-contact type regulator and would be of no avail on a strictly vibratory or Tirrill type regulator. The stabilizing or compounding rheostat 23 provides stabilization and also acts as a detuning resistor to eliminate any undesirable resonant conditions due to the presence of the capacitor.

A rectifier 35, which may desirably be of the selenium type, is connected across the compounding rheostat 23 so as to be blocking in the direction of steady state transfer current but offering a unilateral path to the transient components appearing across it and tending to flow in the opposite direction. Thus the rectifier acts to separate the functions of stabilizing and compounding by freely allowing the transient current to pass in the rectifier's conducting direction.

Inasmuch as the purpose of the regulation system is to hold constant voltage within the permissible range of generator field current as speed or load is varied, in the embodiment illustrated and described, the operation is as follows: At low speed (i. e., with maximum field current) the contact bar 14 is in its normally-closed position thereby providing approximately full line voltage across the field. At top speed the contact bar is open inserting maximum resistance and the voltage across the field is a minimum.

It will be seen from Fig. 2 that at low speed (contact bar closed) there is a maximum voltage difference between field and regulator coils resulting in maximum transfer current through the compounding rheostat 23 and the paralleled rectifier. The system is so designed that at top speed ( i. e. with the contact bar open) the voltage difference between field and coils is zero. In other words, at top speed the coil voltage (of the shunt coils) is equal to the field voltage (plus small drop across series coils) so that there is no steady state transfer current and there is no D. C. voltage across the rectifier in its conducting direction. This condition can be assured by adjustment of the voltage control rheostat 21 or by proper coil design.

In as much as the floating shunt coil 13 is connected substantially across the shunt field winding 16, the energization of coil 13 is changed in accordance with rate of change of current in the shunt field winding 16. Upon any change of current in the shunt field winding an inductive voltage is set up across its terminals tending to maintain the flux. This inductive voltage will transiently vary the current through the shunt field winding 16, the series winding 22, and the floating shunt winding 13, its effect on the coil 13 tending to prevent hunting of the moving element 12.

This transient current must be of sufficient intensity adequately to carry out the desired stabilizing function. On the other hand, as the impedance of the stabilizing circuit is reduced to provide a transient stabilizing current of sufficient intensity, there would be (except for the presence of capacitor and blocking rectifier) a steady state power loss through the stabilizing circuit which would be appreciable and would effect the speed or field current range over which constant voltage could be maintained. With the blocking rectifier, however, there can be an appreciable stabilizing effect in the one direction and yet there can be provided a high value of stabilizing resistance to reduce steady state power loss in the opposite direction. The rectifier also eliminates the dilemma of insufficient resistance resulting in too much transient feed with resultant over correction and over activity of floating coil and contact bar, and too much resistance resulting in too small a transient feed and hence instability.

With the arrangement illustrated and described it is possible to have adequate stabilization at high speed without over stabilization at low speed. Those skilled in the art will recognize that rheostat 23 acts as a compounding rheostat so that by its adjustment the flatness of the voltage curve with speed may be affected. With the arrangement illustrated and described the compounding and stabilizing functions of the circuit have been separated to provide considerable leeway in compounding. Voltage at high speed can be set by adjustment of the voltage control rheostat 21 and of calibrating spring tensions regardless of the value of the compounding resistance since at high speed no current flows through it. At low speed the transfer current may be raised by adjustment of the compounding rheostat 23 which, therefore, provides a means for raising or lowering the voltage at low speed (with respect to that at high speed) to provide for flat compounding. Addition of the rectifier which offers practically no resistance in its conducting direction makes this compounding rheostat adjustment independent of stabilizing requirements.

There is thus provided a device of the character described capable of meeting the objects hereinabove set forth and whereby an electric regulating system may be quickly damped to provide very satisfactory stabilizing together with adequate leeway in compounding.

While we have illustrated and described particular embodiments of our invention, modifications thereof will become apparent to those skilled in the art. We, therefore, desire it to be understood that our invention is not to be limited to the particular arrangements disclosed, and intend in the appended claims to cover all modifications which do not depart from the spirit and scope of our invention.

What we claim as new and desire to secure by Letters Patent of the United States is:

1. In an electrical control apparatus, a dynamic type main control element having a moveable coil arranged to move in a magnetic field produced by a field coil, a regulating resistance divided into sections, a contact member for successively short-circuiting said sections responsive to movement of said moveable coil, means including a source of potential and a controlled winding adapted to be effected by short-circuiting of said resistance sections for voltage regulation, and means including a connection from said last-mentioned winding to said moveable coil through a compounding resistance having a rectifier in parallel therewith for stabilizing the operation of said moveable coil responsive to current changes in said controlled winding.

2. In a regulating system, a regulator having an operating coil for controlling the current in a dynamo-electric machine field winding, means including a rectifier for applying to said coil a voltage which is proportional to the voltage drop across said field winding and in a direction to oppose the action of said regulator, and means including a rheostat arranged in parallel with said rectifier for applying to said coil a voltage which is proportional to the current in said field winding.

3. In combination a variable resistance type electrical regulator having an operating winding, a circuit the current in which is controlled by said regulator, an electrical damping means including a rheostat and a rectifier arranged in parallel circuit relation with said rheostat, said damping means including means for applying to said coil a voltage which varies in accordance with the inductive drop in said circuit and through said rectifier in its conducting direction combined with means for applying to said coil an opposite voltage which varies in accordance with the resistance voltage drop through said rheostat.

4. In an electrical regulating system, a direct current generator having a shunt type field winding, a regulating relay of the variable resistance dynamic multicontact type having a magnetic structure with a fixed exciting coil and a floating element provided with a floating shunt type coil, a tapped resistance arranged in series with said generator field winding, said relay having a contact bar adapted to selectively short-circuit the taps of said resistance, means including a control rheostat for energizing said floating shunt coil from the output of said direct current generator, and means for stabilizing the operation of said regulating system including a connection from said floating shunt coil to said shunt field winding through a rectifier connected in substantially parallel circuit relation with a compounding rheostat and a capacitor.

5. In an electrical regulating system, a direct current generator having a shunt type field winding, a regulating relay of the variable resistance dynamic multicontact type having a magnetic structure with a fixed exciting coil and a floating element provided with a floating shunt type coil, said floating element also provided with a floating series type coil arranged in series with said shunt field winding, a tapped resistance arranged in series with said field winding, said relay having a contact bar adapted to selectively short-circuit the taps of said resistance, means including a control rheostat for energizing said floating shunt coil from the output of said direct current generator, and means for stabilizing the operation of said regulating system including a connection substantially paralleling said floating shunt coil across said shunt field winding and said floating series type coil through a rectifier connected in parallel circuit relation with a compounding rheostat and a capacitor.

6. In an electrical regulating system, an electrical device adapted to have its output regulated by its input, a regulating relay having a magnetic structure and a floating element provided with a floating shunt type coil, said relay having a contact bar adapted to be operated by said floating element, a tapped resistance arranged in series with said device input, means adapting said contact bar to selectively short-circuit portions of said resistance, means for energizing said floating coil from a substantially constant source of potential, and means for stabilizing and compounding the operation of said regulating system including a connection placing said floating coil across said device input through a compounding rheostat arranged in parallel circuit relation with a blocking rectifier.

7. In a regulator system, a dynamoelectric machine for supplying unidirectional current to circuit supply conductors and provided with a field winding, a field energizing circuit including said field winding and a field control resistor connected in series between said conductors, a relay for dynamically short-circuiting a variable proportion of said resistor for controlling the effective value thereof, a control circuit resistor, an anti-hunting means comprising a capacitor connected from a junction point between said relay winding and said control circuit resistor and a pre-selected tap on said field control resistor, said anti-hunting means also comprising a blocking rectifier connected from a junction point between said field winding and said regulating resistor to a junction point between said relay winding and said control circuit resistor, and means for compounding the operation of said regulator system comprising an adjustable rheostat connected in parallel circuit relation wtih said blocking rectifier.

8. In an electrical control system, the combination comprising a direct current generator having a field exciting winding, a variable resistor connected in series circuit relation with said field exciting winding to complete an energizing circuit for said generator, a dynamic regulator comprising a voltage responsive floating element arranged to control the effective resistance of said resistor thereby to regulate the voltage of said generator, said floating element including an actuating winding connected for response to the terminal voltage of said generator, and means including a blocking rectifier and rheostat in parallel circuit relation for connecting said actuating winding across said field exciting winding through said rheostat and incidentally across said rectifier in its blocking direction for steady state feed back to said field exciting winding, and through said rectifier in its conducting direction and incidentally through said rheostat for energization of said actuating winding responsive to voltage changes across said field exciting winding and in a sense tending to stabilize the operation of said combination.

GEORGE I. DUTTON.
ROY E. FOUNTAIN.

No references cited.